(12) United States Patent
Azarian Yazdi et al.

(10) Patent No.: US 10,383,073 B2
(45) Date of Patent: Aug. 13, 2019

(54) UPLINK-BASED MOBILITY WITHOUT DOWNLINK ZONE SIGNALS

(71) Applicant: QUALCOMM Incorporated, San Diego, CA (US)

(72) Inventors: Kambiz Azarian Yazdi, San Diego, CA (US); Haitong Sun, San Diego, CA (US); Tingfang Ji, San Diego, CA (US); Hung Ly, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/708,362

(22) Filed: Sep. 19, 2017

(65) Prior Publication Data

US 2018/0092054 A1    Mar. 29, 2018

Related U.S. Application Data

(60) Provisional application No. 62/401,804, filed on Sep. 29, 2016.

(51) Int. Cl.
| | |
|---|---|
| *H04W 56/00* | (2009.01) |
| *H04W 76/28* | (2018.01) |
| *H04W 52/32* | (2009.01) |
| *H04W 74/08* | (2009.01) |
| *H04W 88/02* | (2009.01) |

(52) U.S. Cl.
CPC ....... *H04W 56/001* (2013.01); *H04W 52/325* (2013.01); *H04W 74/0833* (2013.01); *H04W 76/28* (2018.02); *H04W 74/0883* (2013.01); *H04W 88/02* (2013.01)

(58) Field of Classification Search
None
See application file for complete search history.

(56) References Cited

U.S. PATENT DOCUMENTS

| | | | | |
|---|---|---|---|---|
| 6,771,660 B1* | 8/2004 | Bourlas | ................... | H04L 29/06 370/350 |
| 2012/0314591 A1* | 12/2012 | Zhang | ................... | H04L 12/189 370/252 |

(Continued)

FOREIGN PATENT DOCUMENTS

| | | |
|---|---|---|
| WO | WO-2013153376 A1 | 10/2013 |
| WO | WO-2016149026 A1 | 9/2016 |
| WO | WO-2017139051 A1 | 8/2017 |

OTHER PUBLICATIONS

International Search Report and Written Opinion—PCT/US2017/052450—ISA/EPO—dated Dec. 11, 2017.

(Continued)

*Primary Examiner* — Hong S Cho
(74) *Attorney, Agent, or Firm* — Patterson & Sheridan, LLP

(57) ABSTRACT

Certain aspects of the present disclosure provide techniques for supporting UL-based mobility without DL zone signals. A DL zone signal may refer to a zone synchronization signal or a zone measurement reference signal. As described herein, a UE may perform certain operations upon power-up or RLF recovery, perform operations in each DRx cycle, and/or perform inter-zone handovers without relying on DL zone signals. Thus, aspects create a more user-centric environment and reduce and/or avoid transmission DL zone signals.

20 Claims, 13 Drawing Sheets

(56) References Cited

U.S. PATENT DOCUMENTS

2015/0003311 A1* 1/2015 Feuersaenger .... H04W 52/0225
   370/311
2016/0270013 A1* 9/2016 Soriaga ............. H04W 56/0015

OTHER PUBLICATIONS

Qualcomm Incorporated, "High Speed Mobility Performance Evaluations", 3GPP Draft, R1-166393, High Speed Mobility Performance Evaluations, 3rd Generation Partnership Project (3GPP), Mobile Competence Centre, 650, Route Des Lucioles, F-06921, Sophia-Antipolis Cedex, France, RAN WG1, Gothenburg, Sweden, Aug. 22, 2016-Aug. 26, 2016, Aug. 21, 2016 (Aug. 21, 2016), 9 pages, XP051125355, Retrieved from the Internet: URL:http://www.3gpp.org/ftp/Meetings3GPPSYNC/RAN1/Docs/ [retrieved on Aug. 21, 2016].

Qualcomm Incorporated, "Uplink Based Mobility Physical Channels", 3GPP Draft, R1-166387, $3^{rd}$ Generation Partnership Project (3GPP), Mobile Competence Centre, 650, Route Des Lucioles, F-06921, Sophia-Antipolis Cedex, France, RAN WG1, Gothenburg, Sweden, Aug. 22, 2016-Aug 26, 2016, Aug. 21, 2016 (Aug. 21, 2016), 5 pages, XP051125354, Retrieved from the Internet: url:http://www.3gpp.org/ftp/Meetings3GPPSYNC/RAN1%20/Docs/ [retrieved on Aug. 21, 2016].

* cited by examiner

UPLINK-BASED MOBILITY WITHOUT DOWNLINK ZONE SIGNALS

CROSS-REFERENCE TO RELATED APPLICATIONS

This application claims benefit of priority from commonly-owned U.S. Provisional Application Ser. No. 62/401,804, filed on Sep. 29, 2016, entitled "UPLINK-BASED MOBILITY WITHOUT DOWNLINK ZONE SIGNALS," which is expressly incorporated herein by reference in its entirety.

INTRODUCTION

Aspects of the present disclosure relate generally to wireless communications systems, and more particularly, to supporting uplink-based mobility without downlink zone signals.

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include Long Term Evolution (LTE) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

In some examples, a wireless multiple-access communication system may include a number of base stations, each simultaneously supporting communication for multiple communication devices, otherwise known as user equipment (UEs). In LTE or LTE-A network, a set of one or more base stations may define an e NodeB (eNB). In other examples (e.g., in a next generation or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more distributed units, in communication with a central unit, may define an access node (e.g., a new radio base station (NR BS), a new radio node-B (NR NB), a network node, 5G NB, gNB, etc.). A base station or DU may communicate with a set of UEs on downlink channels (e.g., for transmissions from a base station or to a UE) and uplink channels (e.g., for transmissions from a UE to a BS or DU).

These multiple access technologies have been adopted in various telecommunication standards to provide a common protocol that enables different wireless devices to communicate on a municipal, national, regional, and even global level. An example of an emerging telecommunication standard is new radio (NR), for example, 5G radio access. NR is a set of enhancements to the LTE mobile standard promulgated by Third Generation Partnership Project (3GPP). It is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL) as well as support beamforming, multiple-input multiple-output (MIMO) antenna technology, and carrier aggregation.

However, as the demand for mobile broadband access continues to increase, there exists a need for further improvements in NR technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects of the present disclosure generally relate to methods and apparatus for supporting UL-based mobility without the transmission of DL zone reference signals. Additionally, aspects relate to transmitting downlink keep alive messages including synchronization information and/or transmit power information for an uplink chirp signal.

Certain aspects of the present disclosure provide a method for wireless communication that may be performed, for example, by a UE. The method generally includes determining the UE is at least one of waking-up, performing a radio link failure (RLF) recovery procedure, or is commanded to perform a handover from a serving transmit/receive point (TRP) to a non-serving TRP, wherein the serving TRP and non-serving TRP are managed by different access network controllers (ANCs), and in response to the determination, performing a random access procedure (RACH) using at least one synchronization signal associated with at least one of the serving or non-serving TRPs.

Certain aspects of the present disclosure provide a method for wireless communication that may be performed, for example, by a UE. The method generally includes transmitting a first chirp signal, receiving a keep alive (KA) signal, in response to the first chirp signal, in a first wake period of a discontinuous receive (DRx) cycle, and transmitting a second chirp signal based, at least in part, on information determined from the KA signal.

Certain aspects of the present disclosure provide a method for wireless communication that may be performed, for example, by a TRP. The method generally includes receiving a first chirp signal from a user equipment (UE) and transmitting a keep alive (KA) signal in response to the first chirp signal, wherein the KA signal comprises information regarding at least one of synchronization to the TRP or power control for a subsequent chirp signal.

Certain aspects of the present disclosure provide an apparatus for wireless communication that may be performed, for example, by a UE. The apparatus generally includes means for determining the UE is at least one of waking-up, performing a radio link failure (RLF) recovery procedure, or is commanded to perform a handover from a serving transmit/receive point (TRP) to a non-serving TRP, wherein the serving TRP and non-serving TRP are managed by different access network controllers (ANCs), and in response to the means for determining, means for performing a random access procedure (RACH) using at least one synchronization signal associated with at least one of the serving or non-serving TRPs.

Certain aspects of the present disclosure provide an apparatus for wireless communication that may be performed, for example, by a UE. The apparatus generally includes means for transmitting a first chirp signal, means for receiving a keep alive (KA) signal, in response to the first chirp signal, in a first wake period of a discontinuous receive (DRx) cycle, and means for transmitting a second chirp signal based, at least in part, on information determined from the KA signal.

Certain aspects of the present disclosure provide an apparatus for wireless communication that may be performed, for example, by a TRP. The apparatus generally includes means for receiving a first chirp signal from a user equipment (UE) and means for transmitting a keep alive (KA) signal in response to the first chirp signal, wherein the KA signal comprises information regarding at least one of synchronization to the TRP or power control for a subsequent chirp signal.

Certain aspects of the present disclosure provide an apparatus for wireless communication that may be performed, for example, by a UE. The apparatus generally includes a memory coupled to at least one processor. The at least one processor is configured to determine the UE is at least one of waking-up, performing a radio link failure (RLF) recovery procedure, or is commanded to perform a handover from a serving transmit/receive point (TRP) to a non-serving TRP, wherein the serving TRP and non-serving TRP are managed by different access network controllers (ANCs), and in response to the determination, perform a random access procedure (RACH) using at least one synchronization signal associated with at least one of the serving or non-serving TRPs.

Certain aspects of the present disclosure provide an apparatus for wireless communication that may be performed, for example, by a UE. The apparatus generally includes a transceiver, at least one processor, and a memory coupled to the at least one processor. The transceiver is configured to transmit a first chirp signal, receive a keep alive (KA) signal, in response to the first chirp signal, in a first wake period of a discontinuous receive (DRx) cycle, and transmit a second chirp signal based, at least in part, on information determined from the KA signal.

Certain aspects of the present disclosure provide an apparatus for wireless communication that may be performed, for example, by a TRP. The apparatus generally includes a transceiver, at least one processor, and a memory coupled to the at least one processor. The transceiver is configured to receive a first chirp signal from a user equipment (UE) and transmit a keep alive (KA) signal in response to the first chirp signal, wherein the KA signal comprises information regarding at least one of synchronization to the TRP or power control for a subsequent chirp signal.

Certain aspects of the present disclosure provide a computer readable medium for wireless communication that may be performed, for example, by a UE. The computer readable medium has instructions stored thereon for determining the UE is at least one of waking-up, performing a radio link failure (RLF) recovery procedure, or is commanded to perform a handover from a serving transmit/receive point (TRP) to a non-serving TRP, wherein the serving TRP and non-serving TRP are managed by different access network controllers (ANCs), and in response to the determination, performing a random access procedure (RACH) using at least one synchronization signal associated with at least one of the serving or non-serving TRPs.

Certain aspects of the present disclosure provide a computer readable medium for wireless communication that may be performed, for example, by a UE. The computer readable medium has instructions stored thereon for transmitting a first chirp signal, receiving a keep alive (KA) signal, in response to the first chirp signal, in a first wake period of a discontinuous receive (DRx) cycle, and transmitting a second chirp signal based, at least in part, on information determined from the KA signal.

Certain aspects of the present disclosure provide a computer readable medium for wireless communication that may be performed, for example, by a TRP. The computer readable medium has instructions stored thereon for receiving a first chirp signal from a user equipment (UE) and transmitting a keep alive (KA) signal in response to the first chirp signal, wherein the KA signal comprises information regarding at least one of synchronization to the TRP or power control for a subsequent chirp signal.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
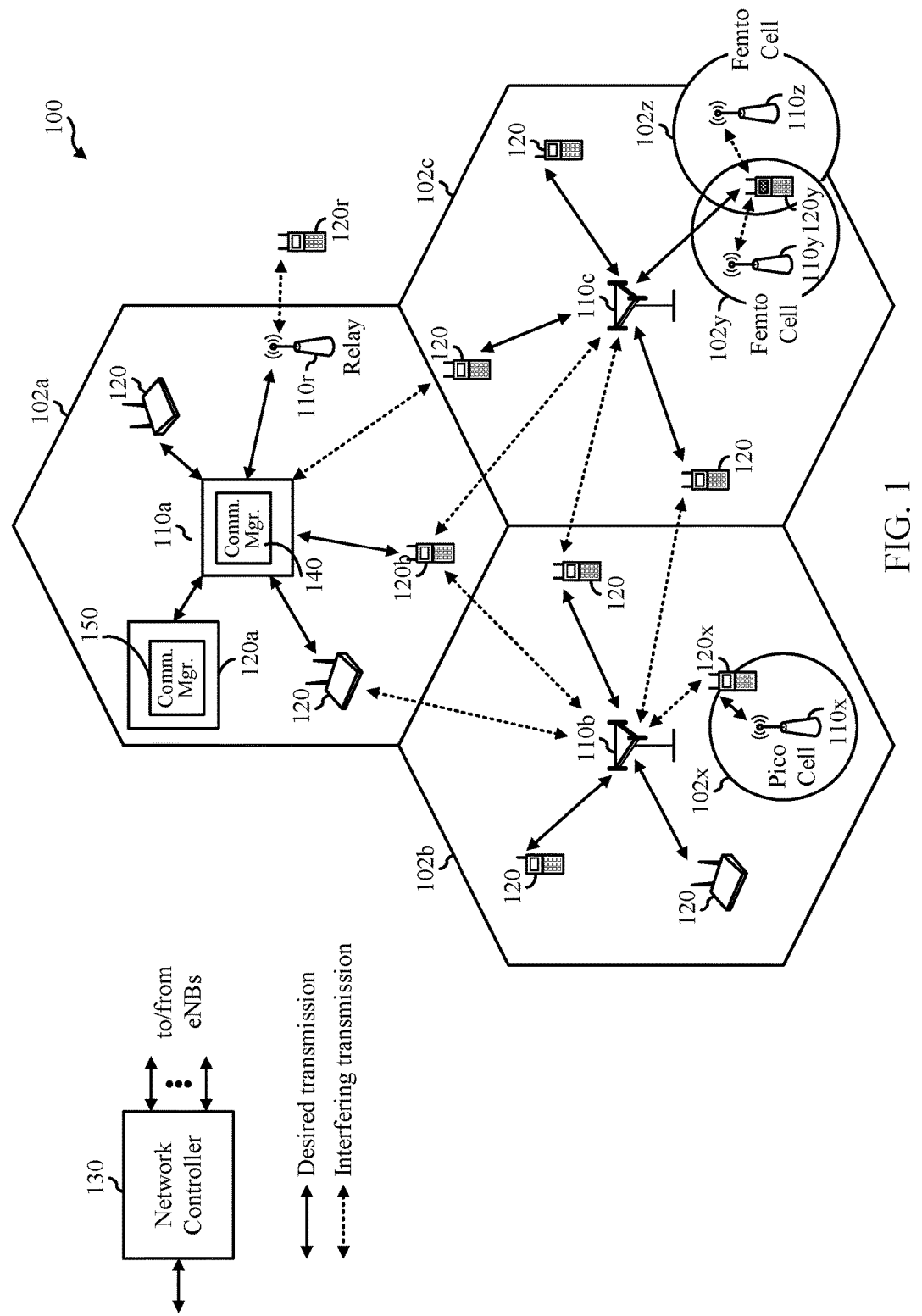
FIG. 1 is a block diagram conceptually illustrating an example telecommunications system, in accordance with certain aspects of the present disclosure.

Aspects of the present disclosure provide apparatus, methods, processing systems, and computer readable mediums for new radio (NR) (new radio access technology or 5G technology).

NR may support various wireless communication services, such as Enhanced mobile broadband (eMBB) targeting wide bandwidth (e.g., 80 MHz beyond), millimeter wave (mmW) targeting high carrier frequency (e.g., 60 GHz), massive MTC (mMTC) targeting non-backward compatible MTC techniques, and/or mission critical techniques targeting ultra reliable low latency communications (URLLC). These services may include latency and reliability requirements. These services may also have different transmission time intervals (TTI) to meet respective quality of service (QoS) requirements. In addition, these services may co-exist in the same subframe.

Aspects of the present disclosure provide methods and apparatus for supporting UL-based mobility without the use of DL zone signals (such as DL zone reference signals). As described herein, a DL zone reference signal may refer to a zone synchronization signal such as a zone PSS and/or zone SSS. A zone reference signal may additionally or alternatively refer to a zone-measurement reference signal (MRS-z).

By supporting UL-based mobility without the use of zone signals, the UE may advantageously avoid expending resources searching for and measuring a zone signals. Additionally, the frequency with which cells transmit zone signals may decrease. As an example, UEs may use other signals (e.g., KA, synchronization signals associated with a TRP, etc.) instead of zone signals. By using other signals, a UE may avoid expending additional energy searching for and measuring a zone signal, the network may save resources and power by not transmitting a zone signal, and call-flows (e.g., communication) between the UE and TRP may be simplified.

For example, a UE may perform a RACH procedure using a synchronization signal associated with a serving or non-serving TRP, as opposed to a DL zone signal. A TRP may advantageously transmit a KA message that includes synchronization information and/or transmit power control information for a future UL chirp transmission.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication networks such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). NR is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

Example Wireless Communications System

FIG. 1 illustrates an example wireless network 100 in which aspects of the present disclosure may be performed. For example, the wireless network may be a new radio (NR) or 5G network. According to aspects of the present disclosure, a UE may perform certain actions without the use of a zone synchronization signal.

As will be described in more detail herein, a UE may be in a zone including a serving TRP managed by a first ANC (e.g., see FIG. 2). In certain scenarios, the UE may perform a random access (RACH) procedure using a synchronization signal associated with at least the serving TRP or a non-serving TRP managed by a second ANC, as opposed to performing the RACH procedure using a DL zone synchronization signal. A zone synchronization signal may include a zone PSS or a zone SSS.

For example, in response to determining the UE is waking-up, performing a radio link failure (RLF) recovery procedure, is commanded to perform a handover from a serving TRP in a first zone to a non-serving TRP in a second zone, or a combination thereof, the UE may perform a RACH procedure using a synchronization signal associated with the serving or non-serving TRPs (or a combination thereof). In this manner, a zone synchronization signal may not be needed upon power on, RLF recovery, or to perform inter-zone handovers.

According to aspects, to support UL mobility without zone signals, a UE may transmit a first UL chirp signal. The UE may receive a keep alive (KA) signal, in response to the first chirp signal. The KA may be received in a first wake period of a discontinuous receive (DRx) cycle. The UE may transmit a second chirp signal using information determined from the KA signal. Thus, the UE may transmit a second chirp signal without the use of a DL zone synchronization signals. The second KA may be transmitted in a same or different wake period of the DRx cycle in which the KA was received. Advantageously, the UE may use information from the KA signal (and not information from a zone signal (zone synchronization signal and/or MRS-z) to transmit a subsequent chirp signal. For example, the UE may determine a transmit power (for open loop power control) based on the KA. According to another example, the UE may decode a power control field in the KA and transmit the second chirp signal based, at least in part on decoded power control information.

Correspondingly, according to aspects, a TRP may receive a first chirp signal from a UE. The TRP may transmit a KA signal in response to the received first chirp signal. The KA may include information regarding at least one of synchronization to the TRP or power control for a subsequent chirp signal (or a combination thereof). As described above, a UE may receive the KA, and use the information to transmit a second chirp signal, thereby avoiding the use of a zone signal such as a zone PSS, zone SSS, and/or MRS-z.

The KA may include information regarding one or increasing or decreasing the transmit power for a subsequent chirp signal. According to aspects, the TRP may periodically transmit a "dense" KA. A dense KA may have more (e.g., additional) information as compared to a non-dense or "regular" KA. The additional information may be transmitted using additional bits included in the dense KA. The dense KA may be transmitted less frequently that a non-dense KA. A dense KA may be transmitted in accordance with a periodicity. The periodicity of the dense KA may be transmitted to the UE to facilitate reception by the UE. In this manner, a network may avoid transmitting a DL zone signal for operations in each DRx cycle.

Thus, as described herein, a zone signal may not be needed upon power-on or RLF recovery (e.g., for performing a RACH procedure with the network), for inter-zone handovers (e.g., for performing as RACH procedure with a target cell/zone), or during each DRx cycle (e.g., for power control of subsequent UL chirp signals and resynchronizing with the network).

UEs 120 may be configured to perform the operations 1000 and 1100 and other methods described herein and discussed in more detail below for UL mobility without zone signals. Base station (BS) 110 may comprise a transmission reception point (TRP), Node B (NB), 5G NB, access point (AP), new radio (NR) BS, etc.). The NR network 100 may include the central unit. The BS 110 may perform complementary operations to the operations 1100 performed by the UE. The BS 110 may perform the operations 1200 and other operations described herein.

As an example, to aspects, the BS 110a and the UE 120a may each include a communication manager module 140 and 150, respectively. The communication manager 140, 150 may assist in uplink-based mobility without the use of DL zone signals and other aspects described herein. The communication manager may be a separate entity or may be incorporated within any one or more modules illustrated, for example in FIGS. 4, 13, and 14. As an example, the communication manager may be part of the controller/processor 440, 480, processors 1320, 1420, and/or the transceiver 432, 454, 1310, 1412.

As illustrated in FIG. 1, the wireless network 100 may include a number of BSs 110 and other network entities. A BS may be a station that communicates with UEs. Each BS 110 may provide communication coverage for a particular geographic area. In 3GPP, the term "cell" can refer to a coverage area of a Node B and/or a Node B subsystem serving this coverage area, depending on the context in which the term is used. In NR systems, the term "cell" and gNB, Node B, 5G NB, AP, NR BS, NR BS, or TRP may be interchangeable. In some examples, a cell may not necessarily be stationary, and the geographic area of the cell may move according to the location of a mobile base station. In some examples, the base stations may be interconnected to one another and/or to one or more other base stations or network nodes (not shown) in the wireless network 100 through various types of backhaul interfaces such as a direct physical connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a frequency channel, etc. Each frequency may support a single RAT in a given geographic area in order to avoid interference between wireless networks of different RATs. In some cases, NR or 5G RAT networks may be deployed.

A BS may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BS for the femto cells 102y and 102z, respectively. A BS may support one or multiple (e.g., three) cells.

The wireless network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110r may communicate with the BS 110a and a UE 120r in order to facilitate communication between the BS 110a and the UE 120r. A relay station may also be referred to as a relay BS, a relay, etc.

The wireless network 100 may be a heterogeneous network that includes BSs of different types, e.g., macro BS, pico BS, femto BS, relays, etc. These different types of BSs may have different transmit power levels, different coverage areas, and different impact on interference in the wireless network 100. For example, macro BS may have a high transmit power level (e.g., 20 Watts) whereas pico BS, femto BS, and relays may have a lower transmit power level (e.g., 1 Watt).

The wireless network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may couple to a set of BSs and provide coordination and control for these BSs. The network controller 130 may communicate with the BSs 110 via a backhaul. The BSs 110 may also communicate with one another, e.g., directly or indirectly via wireless or wireline backhaul.

The UEs 120 (e.g., 120x, 120y, etc.) may be dispersed throughout the wireless network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered evolved or machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices.

In FIG. 1, a solid line with double arrows indicates desired transmissions between a UE and a serving BS, which is a BS designated to serve the UE on the downlink and/or uplink. A dashed line with double arrows indicates interfering transmissions between a UE and a BS.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a 'resource block') may be 12 subcarriers (or 180 kHz). Consequently, the nominal FFT size may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz (i.e., 6 resource blocks), and there may be 1, 2, 4, 8 or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR.

NR may utilize OFDM with a CP on the uplink and downlink and include support for half-duplex operation using TDD. A single component carrier bandwidth of 100 MHz may be supported. NR resource blocks may span 12 sub-carriers with a sub-carrier bandwidth of 75 kHz over a 0.1 ms duration. Each radio frame may consist of 50 subframes with a length of 10 ms. Consequently, each subframe may have a length of 0.2 ms. Each subframe may indicate a link direction (i.e., DL or UL) for data transmission and the link direction for each subframe may be dynamically switched. Each subframe may include DL/UL data as well as DL/UL control data. UL and DL subframes for NR may be as described in more detail below with respect to FIGS. 6 and 7. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based. NR networks may include entities such CUs and/or DUs.

In some examples, access to the air interface may be scheduled, wherein a scheduling entity (e.g., a base station) allocates resources for communication among some or all devices and equipment within its service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P)

network, and/or in a mesh network. In a mesh network example, UEs may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

As noted above, a RAN may include a CU and one or more DUs. A NR BS (e.g., gNB, 5G Node B, Node B, TRP, access point (AP)) may correspond to one or multiple BSs. NR cells can be configured as access cell (ACells) or data only cells (DCells). For example, the RAN (e.g., a central unit or distributed unit) can configure the cells. DCells may be cells used for carrier aggregation or dual connectivity, but not used for initial access, cell selection/reselection, or handover. In some cases DCells may not transmit synchronization signals—in some case cases DCells may transmit SS. NR BSs may transmit downlink signals to UEs indicating the cell type. Based on the cell type indication, the UE may communicate with the NR BS. For example, the UE may determine NR BSs to consider for cell selection, access, handover, and/or measurement based on the indicated cell type.

Figure 2:
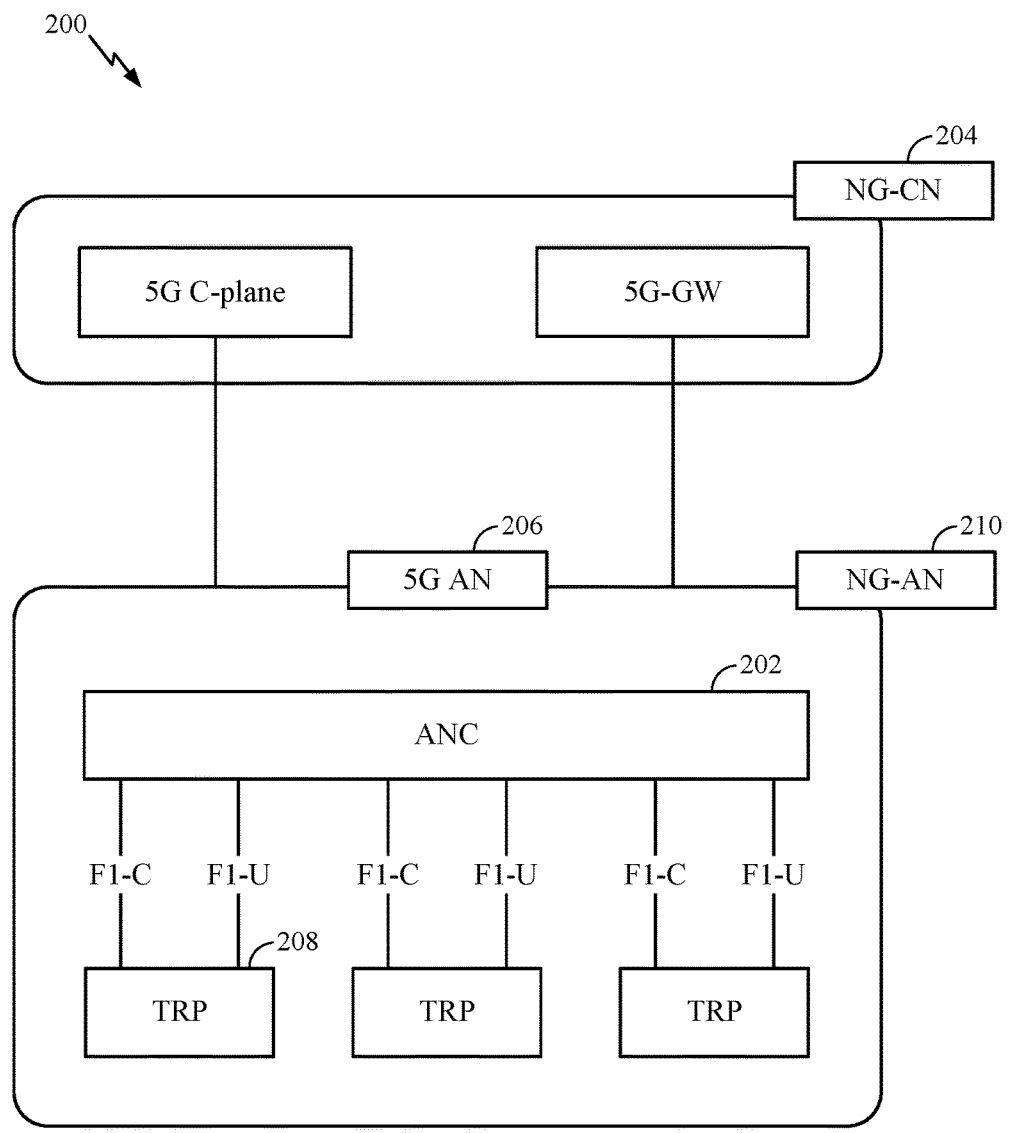
FIG. 2 is a block diagram illustrating an example logical architecture of a distributed RAN, in accordance with certain aspects of the present disclosure.

FIG. 2 illustrates an example logical architecture of a distributed RAN 200, which may be implemented in the wireless communication system illustrated in FIG. 1. A 5G access node 206 may include an access node controller (ANC) 202. The ANC may be a central unit (CU) of the distributed RAN 200. The backhaul interface to the next generation core network (NG-CN) 204 may terminate at the ANC. The backhaul interface to neighboring next generation access nodes (NG-ANs) may terminate at the ANC. The ANC may include one or more TRPs 208 (which may also be referred to as BSs, NR BSs, Node Bs, 5G NBs, APs, or some other term). As described above, a TRP may be used interchangeably with "cell."

The TRPs 208 may be a DU. The TRPs may be connected to one ANC (ANC 202) or more than one ANC (not illustrated). For example, for RAN sharing, radio as a service (RaaS), and service specific deployments, the TRP may be connected to more than one ANC. A TRP may include one or more antenna ports. The TRPs may be configured to individually (e.g., dynamic selection) or jointly (e.g., joint transmission) serve traffic to a UE.

The local architecture 200 may be used to illustrate fronthaul definition. The architecture may be defined that support fronthauling solutions across different deployment types. For example, the architecture may be based on transmit network capabilities (e.g., bandwidth, latency, and/or jitter).

The architecture may share features and/or components with LTE. According to aspects, the next generation AN (NG-AN) 210 may support dual connectivity with NR. The NG-AN may share a common fronthaul for LTE and NR.

The architecture may enable cooperation between and among TRPs 208. For example, cooperation may be present within a TRP and/or across TRPs via the ANC 202. According to aspects, no inter-TRP interface may be needed/present.

According to aspects, a dynamic configuration of split logical functions may be present within the architecture 200. As will be described in more detail with reference to FIG. 5, the Radio Resource Control (RRC) layer, Packet Data Convergence Protocol (PDCP) layer, Radio Link Control (RLC) layer, Medium Access Control (MAC) layer, and a Physical (PHY) layers may be adaptably placed at the DU or CU (e.g., TRP or ANC, respectively). According to certain aspects, a BS may include a central unit (CU) (e.g., ANC 202) and/or one or more distributed units (e.g., one or more TRPs 208).

Figure 3:
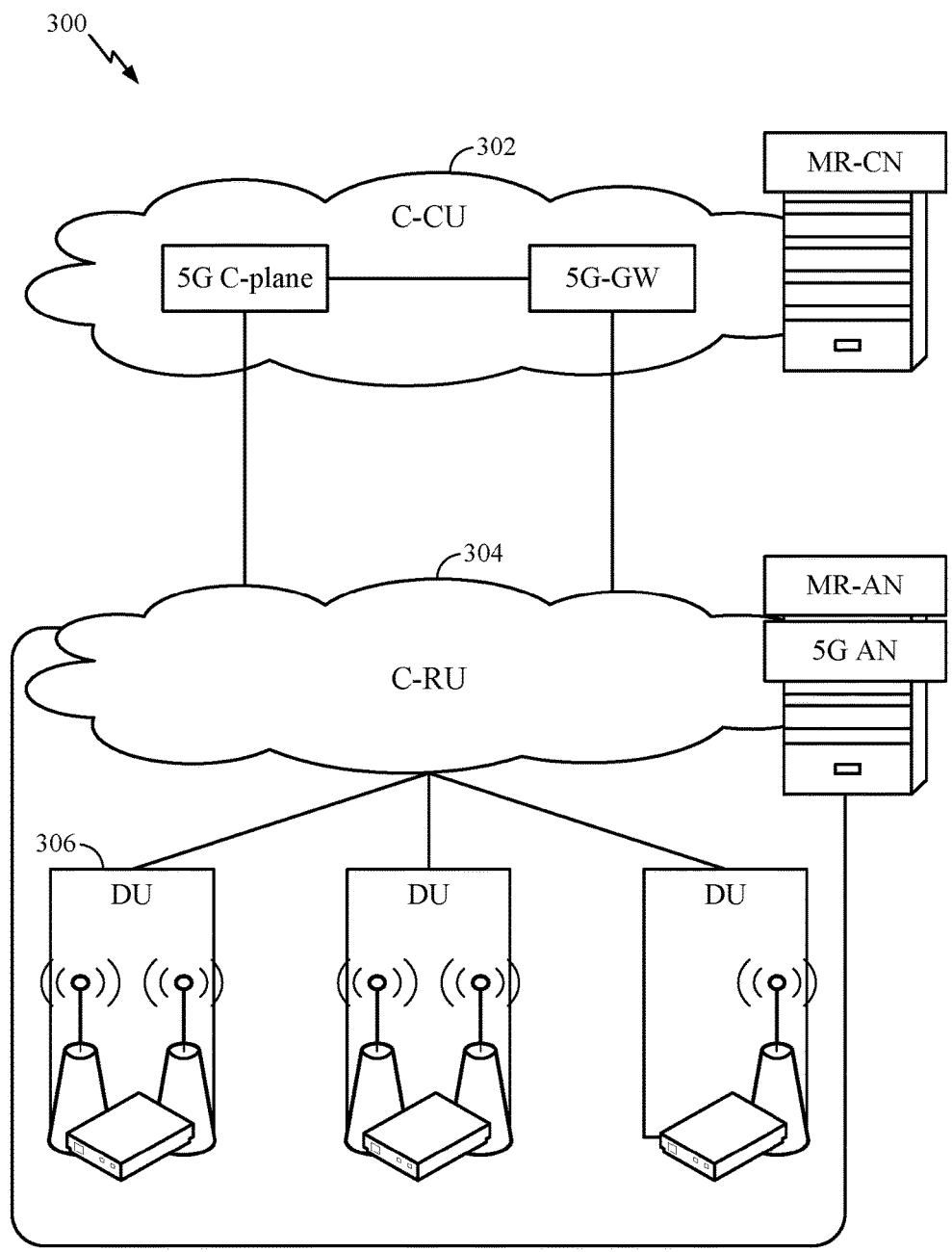
FIG. 3 is a diagram illustrating an example physical architecture of a distributed RAN, in accordance with certain aspects of the present disclosure.

FIG. 3 illustrates an example physical architecture of a distributed RAN 300, according to aspects of the present disclosure. A centralized core network unit (C-CU) 302 may host core network functions. The C-CU may be centrally deployed. C-CU functionality may be offloaded (e.g., to advanced wireless services (AWS)), in an effort to handle peak capacity.

A centralized RAN unit (C-RU) 304 may host one or more ANC functions. Optionally, the C-RU may host core network functions locally. The C-RU may have distributed deployment. The C-RU may be closer to the network edge.

A DU 306 may host one or more TRPs (edge node (EN), an edge unit (EU), a radio head (RH), a smart radio head (SRH), or the like). The DU may be located at edges of the network with radio frequency (RF) functionality.

Figure 4:
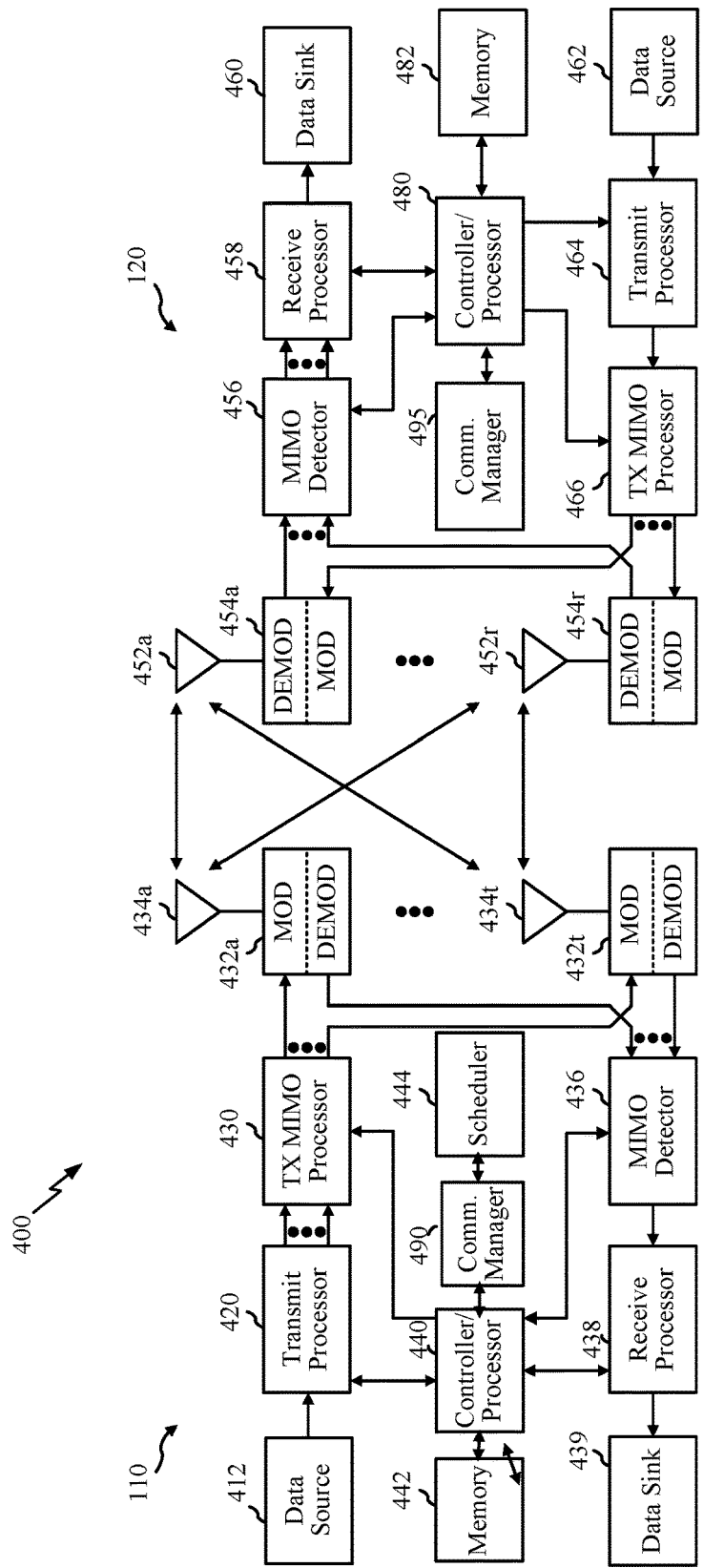
FIG. 4 is a block diagram conceptually illustrating a design of an example TRP and user equipment (UE), in accordance with certain aspects of the present disclosure.

FIG. 4 illustrates example components of the BS 110 and UE 120 illustrated in FIG. 1, which may be used to implement aspects of the present disclosure. As described above, the BS may include a TRP. One or more components of the BS 110 and UE 120 may be used to practice aspects of the present disclosure. For example, antennas 452, Tx/Rx 454, processors 458, 464, 466, and/or controller/processor 480 of the UE 120 and/or antennas 434, Tx/Rx 432, processors 420, 430, 438, and/or controller/processor 440 of the BS 110 may be used to perform the operations described herein and illustrated with reference to FIGS. 10-12.

As described above, the BS and the UE may include a communication manager 490, 495, respectively. According to an example, the communication manager may be configured to control assist in uplink-based mobility without the use of DL zone signals. While the communication manager is illustrated as a separate entity in FIG. 4, according to certain aspects, the communication manager may be incorporated in one or more other modules at the BS and UE. As an example, the communication module may be part of the controller/processor and/or the transceiver.

FIG. 4 shows a block diagram of a design of a BS 110 and a UE 120, which may be one of the BSs and one of the UEs in FIG. 1. For a restricted association scenario, the base station 110 may be the macro BS 110c in FIG. 1, and the UE 120 may be the UE 120y. The base station 110 may also be a base station of some other type. The base station 110 may be equipped with antennas 434a through 434t, and the UE 120 may be equipped with antennas 452a through 452r.

At the base station 110, a transmit processor 420 may receive data from a data source 412 and control information from a controller/processor 440. The control information may be for the Physical Broadcast Channel (PBCH), Physical Control Format Indicator Channel (PCFICH), Physical Hybrid ARQ Indicator Channel (PHICH), Physical Downlink Control Channel (PDCCH), etc. The data may be for the Physical Downlink Shared Channel (PDSCH), etc. The processor 420 may process (e.g., encode and symbol map) the data and control information to obtain data symbols and control symbols, respectively. The processor 420 may also generate reference symbols, e.g., for the PSS, SSS, and cell-specific reference signal. A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. Each modulator 432 may process a respective output symbol stream (e.g., for OFDM, etc.) to obtain an output sample stream. Each modulator 432 may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 120, the antennas 452a through 452r may receive the downlink signals from the base station 110 and may provide received signals to the demodulators (DE-MODs) 454a through 454r, respectively. Each demodulator 454 may condition (e.g., filter, amplify, downconvert, and digitize) a respective received signal to obtain input samples. Each demodulator 454 may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. A receive processor 458 may process (e.g., demodulate, deinterleave, and decode) the detected symbols, provide decoded data for the UE 120 to a data sink 460, and provide decoded control information to a controller/processor 480.

On the uplink, at the UE 120, a transmit processor 464 may receive and process data (e.g., for the Physical Uplink Shared Channel (PUSCH)) from a data source 462 and control information (e.g., for the Physical Uplink Control Channel (PUCCH) from the controller/processor 480. The transmit processor 464 may also generate reference symbols for a reference signal. The symbols from the transmit processor 464 may be precoded by a TX MIMO processor 466 if applicable, further processed by the demodulators 454a through 454r (e.g., for SC-FDM, etc.), and transmitted to the base station 110. At the BS 110, the uplink signals from the UE 120 may be received by the antennas 434, processed by the modulators 432, detected by a MIMO detector 436 if applicable, and further processed by a receive processor 438 to obtain decoded data and control information sent by the UE 120. The receive processor 438 may provide the decoded data to a data sink 439 and the decoded control information to the controller/processor 440.

The controllers/processors 440 and 480 may direct the operation at the base station 110 and the UE 120, respectively. The processor 440 and/or other processors and modules at the base station 110 may perform or direct, e.g., the execution of the functional blocks illustrated in FIG. 12, and/or other processes for the techniques described herein. The processor 480 and/or other processors and modules at the UE 120 may also perform or direct, e.g., the execution of the functional blocks illustrated in FIGS. 10 and 11, and/or other processes for the techniques described herein. The memories 442 and 482 may store data and program codes for the BS 110 and the UE 120, respectively. A scheduler 444 may schedule UEs for data transmission on the downlink and/or uplink.

Figure 5:
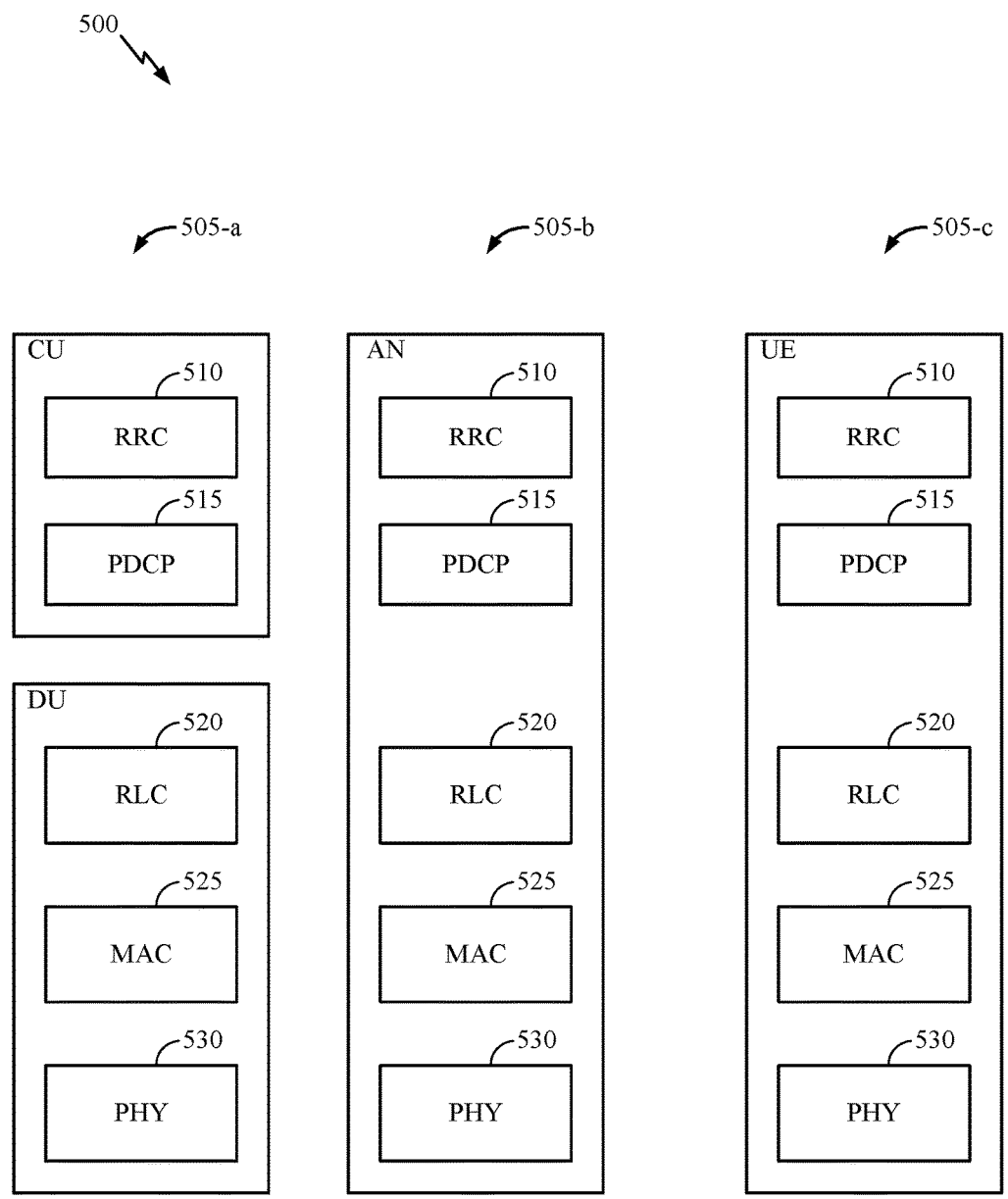
FIG. 5 is a diagram showing examples for implementing a communication protocol stack, in accordance with certain aspects of the present disclosure.

FIG. 5 illustrates a diagram 500 showing examples for implementing a communications protocol stack, according to aspects of the present disclosure. The illustrated communications protocol stacks may be implemented by devices operating in a in a 5G system (e.g., a system that supports uplink-based mobility). Diagram 500 illustrates a communications protocol stack including a Radio Resource Control (RRC) layer 510, a Packet Data Convergence Protocol (PDCP) layer 515, a Radio Link Control (RLC) layer 520, a Medium Access Control (MAC) layer 525, and a Physical (PHY) layer 530. In various examples the layers of a protocol stack may be implemented as separate modules of software, portions of a processor or ASIC, portions of non-collocated devices connected by a communications link, or various combinations thereof. Collocated and non-collocated implementations may be used, for example, in a protocol stack for a network access device (e.g., ANs, CUs, and/or DUs) or a UE.

A first option 505-a shows a split implementation of a protocol stack, in which implementation of the protocol stack is split between a centralized network access device (e.g., an ANC 202 in FIG. 2) and distributed network access device (e.g., DU 208 in FIG. 2). In the first option 505-a, an RRC layer 510 and a PDCP layer 515 may be implemented by the CU, and an RLC layer 520, a MAC layer 525, and a PHY layer 530 may be implemented by the DU. In various examples the CU and the DU may be collocated or non-collocated. The first option 505-a may be useful in a macro cell, micro cell, or pico cell deployment.

A second option 505-b shows a unified implementation of a protocol stack, in which the protocol stack is implemented in a single network access device (e.g., access node (AN), new radio base station (NR BS), a new radio Node-B (NR NB), a network node (NN), or the like.). In the second option, the RRC layer 510, the PDCP layer 515, the RLC layer 520, the MAC layer 525, and the PHY layer 530 may each be implemented by the AN. The second option 505-b may be useful in a femto cell deployment.

Regardless of whether a network access device implements part or all of a protocol stack, a UE may implement an entire protocol stack (e.g., the RRC layer 510, the PDCP layer 515, the RLC layer 520, the MAC layer 525, and the PHY layer 530) as shown at 505-c.

Figure 6:
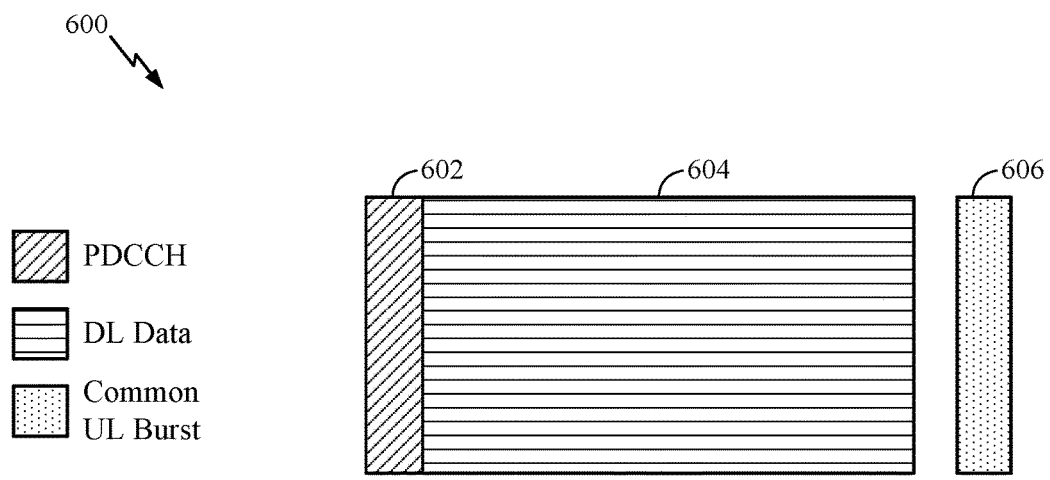
FIG. 6 illustrates an example of a DL-centric subframe, in accordance with certain aspects of the present disclosure.

FIG. 6 is a diagram 600 showing an example of a DL-centric subframe. The DL-centric subframe may include a control portion 602. The control portion 602 may exist in the initial or beginning portion of the DL-centric subframe. The control portion 602 may include various scheduling information and/or control information corresponding to various portions of the DL-centric subframe. In some configurations, the control portion 602 may be a physical DL control channel (PDCCH), as indicated in FIG. 6. The DL-centric subframe may also include a DL data portion 604. The DL data portion 604 may sometimes be referred to as the payload of the DL-centric subframe. The DL data portion 604 may include the communication resources utilized to communicate DL data from the scheduling entity (e.g., UE or BS) to the subordinate entity (e.g., UE). In some configurations, the DL data portion 604 may be a physical DL shared channel (PDSCH).

The DL-centric subframe may also include a common UL portion 606. The common UL portion 606 may sometimes be referred to as an UL burst, a common UL burst, and/or various other suitable terms. The common UL portion 606 may include feedback information corresponding to various other portions of the DL-centric subframe. For example, the common UL portion 606 may include feedback information corresponding to the control portion 602. Non-limiting examples of feedback information may include an ACK signal, a NACK signal, a HARQ indicator, and/or various other suitable types of information. The common UL portion 606 may include additional or alternative information, such as information pertaining to random access channel (RACH) procedures, scheduling requests (SRs), and various other suitable types of information. As illustrated in FIG. 6, the end of the DL data portion 604 may be separated in time from the beginning of the common UL portion 606. This time separation may sometimes be referred to as a gap, a guard period, a guard interval, and/or various other suitable terms. This separation provides time for the switch-over from DL communication (e.g., reception operation by the subordinate entity (e.g., UE)) to UL communication (e.g., transmission by the subordinate entity (e.g., UE)). One of ordinary skill in the art will understand that the foregoing is merely one example of a DL-centric subframe and alternative structures having similar features may exist without necessarily deviating from the aspects described herein.

Figure 7:
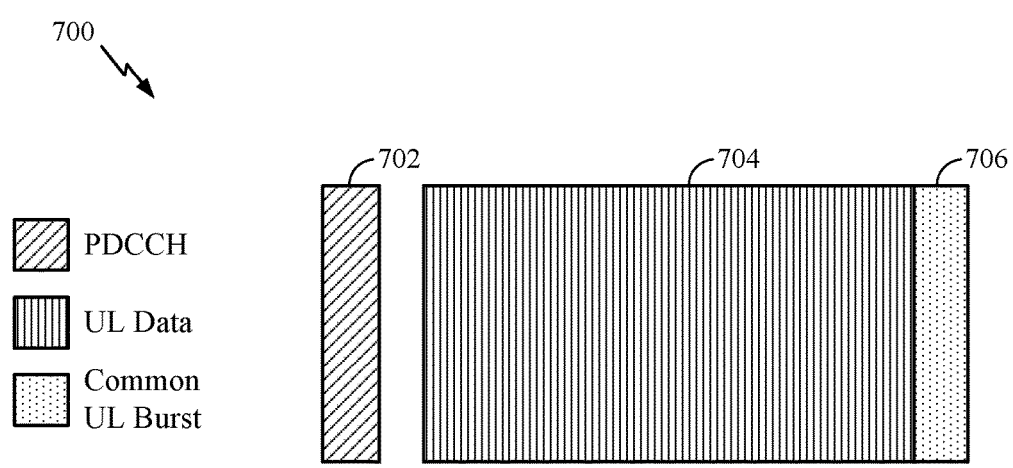
FIG. 7 illustrates an example of an UL-centric subframe, in accordance with certain aspects of the present disclosure.

FIG. 7 is a diagram 700 showing an example of an UL-centric subframe. The UL-centric subframe may include a control portion 702. The control portion 702 may exist in the initial or beginning portion of the UL-centric subframe. The control portion 702 in FIG. 7 may be similar to the control portion described above with reference to FIG. 6. The UL-centric subframe may also include an UL data portion 704. The UL data portion 704 may sometimes be referred to as the payload of the UL-centric subframe. The UL portion may refer to the communication resources utilized to communicate UL data from the subordinate entity (e.g., UE) to the scheduling entity (e.g., UE or BS). In some configurations, the control portion 702 may be a physical DL control channel (PDCCH).

As illustrated in FIG. 7, the end of the control portion 702 may be separated in time from the beginning of the UL data portion 704. This time separation may sometimes be referred to as a gap, guard period, guard interval, and/or various other suitable terms. This separation provides time for the switch-over from DL communication (e.g., reception operation by the scheduling entity) to UL communication (e.g., transmission by the scheduling entity). The UL-centric subframe may also include a common UL portion 706. The common UL portion 706 in FIG. 7 may be similar to the common UL portion 706 described above with reference to FIG. 7. The common UL portion 706 may additional or alternative include information pertaining to channel quality indicator (CQI), sounding reference signals (SRSs), and various other suitable types of information. One of ordinary skill in the art will understand that the foregoing is merely one example of an UL-centric subframe and alternative structures having similar features may exist without necessarily deviating from the aspects described herein.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

A UE may operate in various radio resource configurations, including a configuration associated with transmitting pilots using a dedicated set of resources (e.g., a radio resource control (RRC) dedicated state, etc.) or a configuration associated with transmitting pilots using a common set of resources (e.g., an RRC common state, etc.). When operating in the RRC dedicated state, the UE may select a dedicated set of resources for transmitting a pilot signal to a network. When operating in the RRC common state, the UE may select a common set of resources for transmitting a pilot signal to the network. In either case, a pilot signal transmitted by the UE may be received by one or more network access devices, such as an AN, or a DU, or portions thereof. Each receiving network access device may be configured to receive and measure pilot signals transmitted on the common set of resources, and also receive and measure pilot signals transmitted on dedicated sets of resources allocated to the UEs for which the network access device is a member of a monitoring set of network access devices for the UE. One or more of the receiving network access devices, or a CU to which receiving network access device(s) transmit the measurements of the pilot signals, may use the measurements to identify serving cells for the UEs, or to initiate a change of serving cell for one or more of the UEs.

Figure 8:
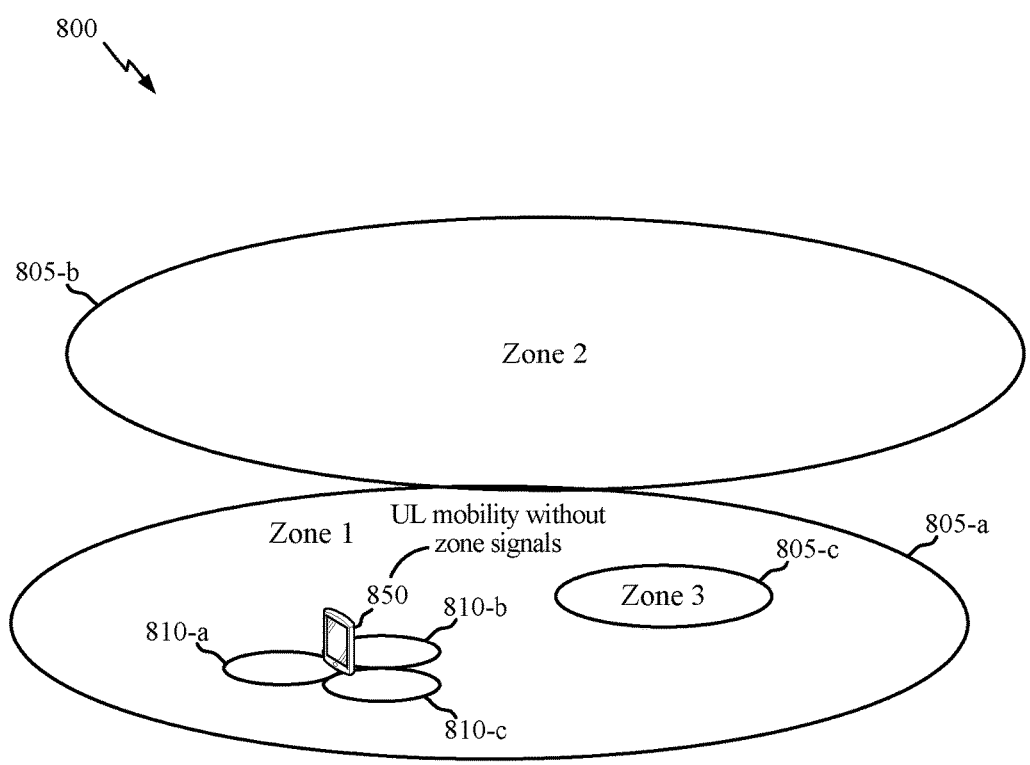
FIG. 8 illustrates an example of a wireless communication system supporting zones, in accordance with certain aspects of the present disclosure.

FIG. 8 illustrates an example of a wireless communication system 800 supporting a number of zones, in accordance with aspects of the present disclosure. The wireless communication system 800 may include a number of zones (including, e.g., a first zone 805-a (Zone 1), a second zone 805-b (Zone 2), and a third zone 805-c (Zone 3)). A number of UEs may move within or between the zones.

A zone may include multiple cells, and the cells within a zone may be synchronized (e.g., the cells may share the same timing). Wireless communication system 800 may include examples of both non-overlapping zones (e.g., the first zone 805-a and the second zone 805-b) and overlapping zones (e.g., the first zone 805-a and the third zone 805-c). In some examples, the first zone 805-a and the second zone 805-b may each include one or more macro cells, micro cells, or pico cells, and the third zone 805-c may include one or more femto cells.

By way of example, the UE 850 is shown to be located in the first zone 805-a. If the UE 850 is operating with a radio resource configuration associated with transmitting pilot signals using a common set of resources, such as an RRC common state, the UE 850 may transmit a pilot signal using a common set of resources. Cells (e.g., ANs, DUs, etc.) within the first zone 805-a may monitor the common set of resources for a pilot signal from the UE 850. If the UE 850 is operating with a radio resource configuration associated with transmitting pilot signals using a dedicated set of resource, such as an RRC dedicated state, the UE 850 may transmit a pilot signal using a dedicated set of resources. Cells of a monitoring set of cells established for the UE 850 within the first zone 805-a (e.g., a first cell 810-a, a second cell 810-b, and a third cell 810-c) may monitor the dedicated set of resources for the pilot signal of the UE 850.

According to aspects of the present disclosure, the UE 850 performs one or more operations without relying on a zone signal such as a zone synchronization signal or zone-MRS. For example, the UE may perform an inter-zone handover using synchronization signals associated with a cell/TRP as opposed to a zone synchronization signal.

Example UL-Based Mobility without DL Zone Signal

Some legacy wireless communication standards base UE mobility decisions on downlink measurements performed by the UE. Future generation wireless communication system including 5G systems may focus on user-centric networks. In effort to create a more user-centric network, aspects of the present disclosure provide methods and apparatus for UL-based mobility without a DL zone signal. As described herein, a zone signal may refer to a zone synchronization signal and/or a zone measurement reference signal.

Several UL-based mobility procedures involve the use of a DL zone signal transmitted by BSs in a same zone. According to one example, a zone signal may be in the form a standalone zone primary synchronization signal (PSS)/zone secondary synchronization signal (SSS). BSs within a zone may be synchronized. Because BSs within a zone may be synchronized, the zone PSS/SSS may be used by a UE to synchronize to multiple BSs in the zone. According to another example, the PSS/SSS of the zone and the cell may be combined, such that a zone synchronization signal (SSS-z) may work in conjunction with a cell PSS/SSS to facilitate a UE synchronizing to a BS. According to another example, a zone may have a mobility reference signal (MRS), which may be referred to as a MRS-z. The collection of the BSs that comprises the zone may transmit the MRS-z. A UE may measure the MRS-z and may determine if it is in a certain zone.

The concept of a zone signal has several disadvantages. First, the UE needs to perform measurements on the zone signal (e.g., PSS/SSS of a zone and/or MRS-z). Accordingly, the UE may use power searching for and measuring the zone signal in addition to the power used for other UE functions. Second, the network may transmit the zone signal, even when no UEs are in the zone. In this manner, the network may expend additional, unnecessary network resources in certain scenarios. Third, zone signals may complicate mobility communication call-flows between the UE and network. For example, using a zone signal may make signaling between a UE and cell in certain scenarios similar to a mix of UL-based and DL-based mobility. For example, inter-zone procedures using a DL zone signal may be similar to DL-based mobility schemes, as opposed to desired handovers based on UL-mobility. Stated otherwise, inter-zone procedures using a DL zone signal may be similar to when a UE hands over between "cells" based on measurement of one or more DL reference signals, as opposed to desired handovers based on UL-mobility where a UE hands over between "zones" in a more user-centric environment.

Figure 9:
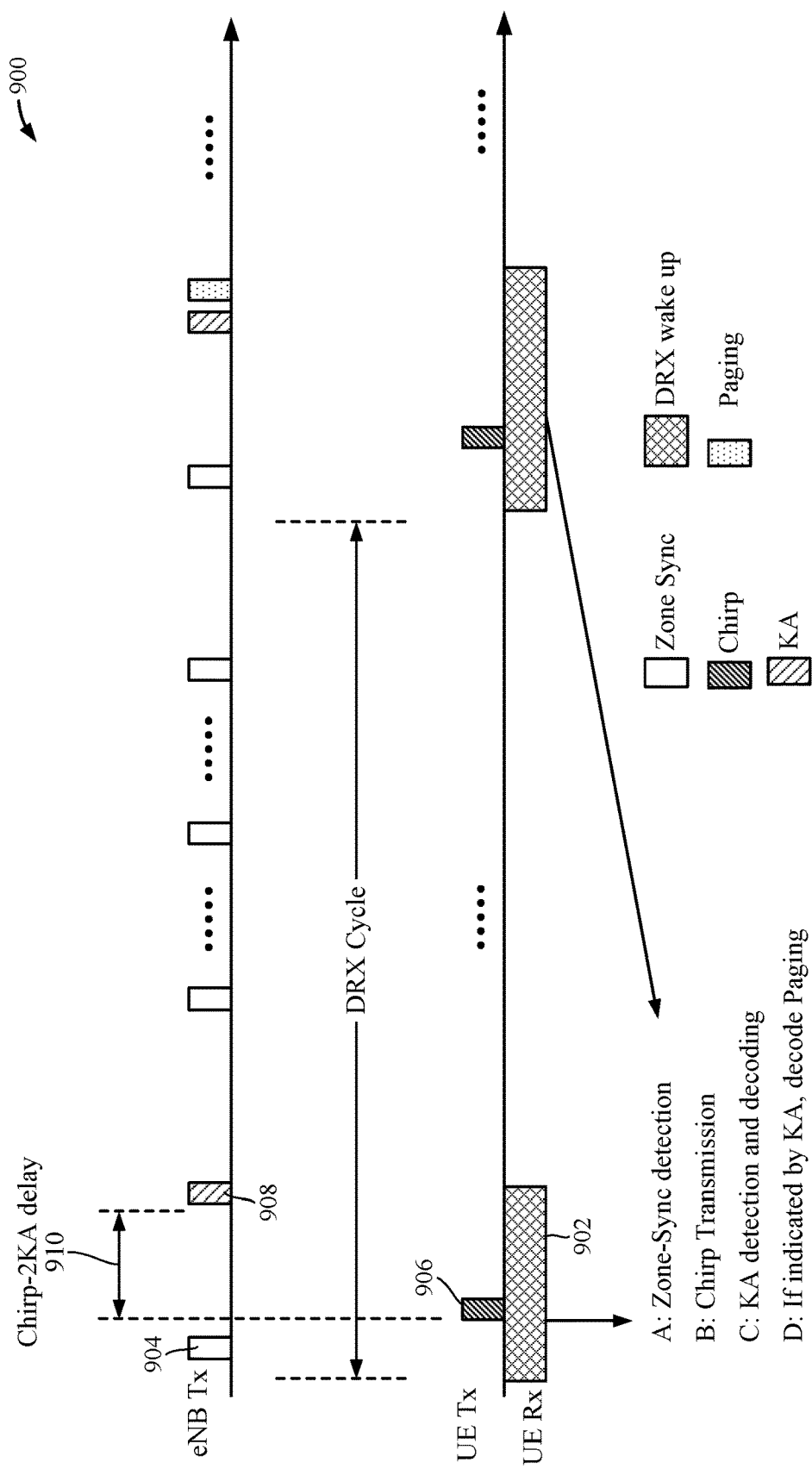
FIG. 9 illustrates an example for UE operation during discontinuous receive (DRx) wake-ups without paging.

FIG. 9 illustrates an example 900 for UE operation during discontinuous receive (DRx) wake-ups without paging. The eNB shown in FIG. 9 may include a TRP (e.g., TRP 110, 208). As described above, a BS may include a TRP.

At 902, the UE may be in a wake period of a DRx cycle. Accordingly, the UE may wake-up and detect a DL zone synchronization signal 904. Examples of zone synchronization signals include, for example, a zone PSS, zone SSS, MRS-z, etc. The UE may use the zone synchronization signal to resynchronize to the zone and/or perform measurements regarding the zone. The UE may measure the zone synchronization signal 904 in an effort to determine if the UE is located in the zone or if the UE has moved into another zone. As described above, a zone may refer to a group of TRPs managed by an ANC (e.g., a zone may include the three TRPs 208 illustrated in FIG. 2, managed by the ANC 202).

The zone synchronization signal 904 may also be used for open loop power control for a future UL chirp transmission 906. For example, based on measuring the zone synchronization signal 904, the UE may determine it is close to a TRP (based on a high SNR of the measured zone synchronization signal). In response, the UE may transmit an UL chirp signal 906 at a lower transmit power as compared to if the UE measured a weaker zone synchronization signal.

In response to the UL chirp signal 906, one or more entities in the network may select a TRP that is appropriate for serving the UE. The selection may be based, at least in part, on pathloss between the UE and a selected TRP. At 908, the TRP may transmit a keep alive (KA) signal to the UE. The UE may decode a paging channel when the KA 908 carries a page intended for the UE. A time delay 910 exists between the UE transmitting the UL uplink chirp signal 906 and the network transmitting a KA 908 in response to the chirp signal 906. The UE may receive the KA 908 because the KA is transmitted during the wake period of a UE's DRx cycle 902.

Currently, DL zone signals 904 (synchronization signals and MRS) may be used by a UE to synchronize or resynchronize to the network, to perform open-loop power control for future uplink reference signal (e.g., chirp signal) transmission, and/or to perform measurements which may be used for inter-zone handovers or radio link failure (RLF) procedures. As wireless communication systems become more user-centric, it may be desirable for a UE to synchronize or resynchronize to the network, perform open loop power control for chirp signals, and perform inter-zone or RLF procedures without relying on received DL reference signals.

Figure 10:
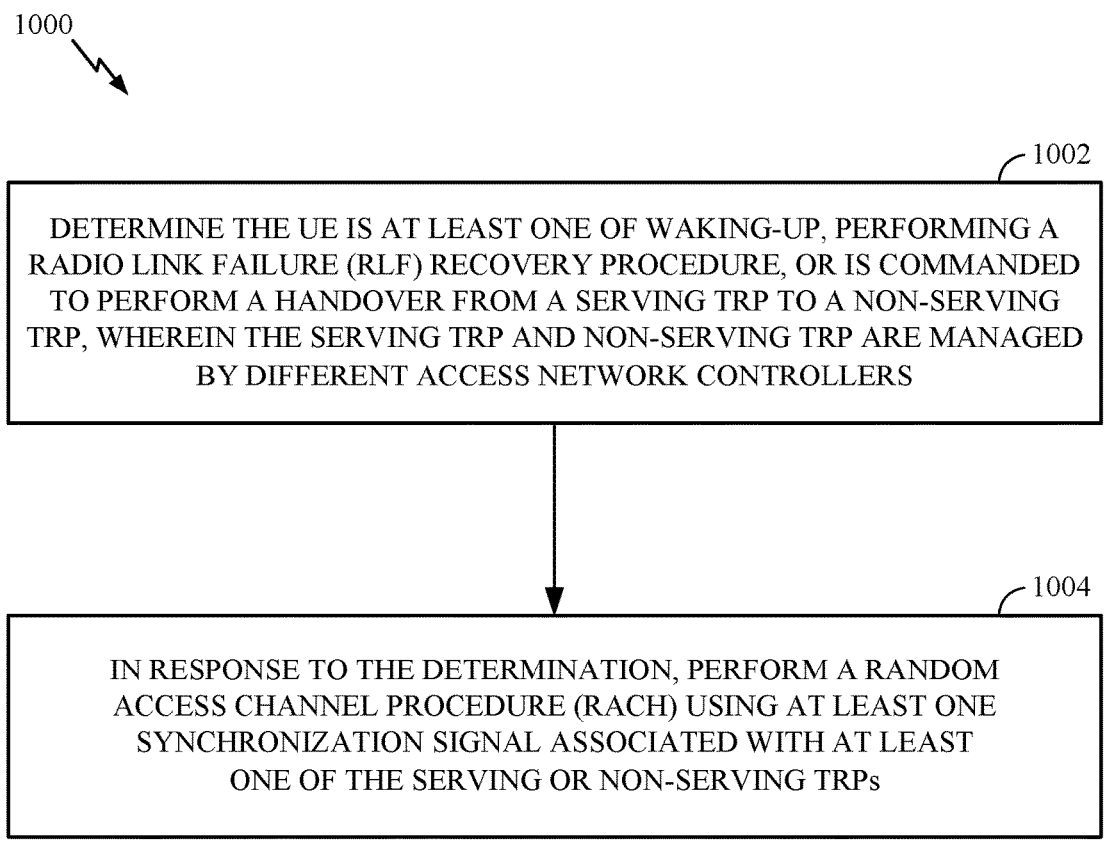
FIG. 10 illustrates example operations performed by a UE, in accordance with certain aspects of the present disclosure.

FIG. 10 illustrates example operations 1000 which may be performed by a UE, in accordance with aspects of the present disclosure. The UE may include one or more modules of UE 120 illustrated in FIG. 4. According to aspects, the UE may be the UE 1302 illustrated in FIG. 13 including one or more components configured to perform the operations described herein.

At 1002, the UE may determine the UE is at least one of waking-up, performing a radio link failure (RLF) recovery procedure, or is commanded to perform a handover from a serving TRP to a non-serving TRP (or a combination thereof), wherein the serving TRP and non-serving TRP are managed by different ANCs. In response to the determination, at 1004, the UE may perform a random access channel procedure (RACH) using at least one synchronization signal associated with at least one of the serving or non-serving TRPs (or a combination thereof).

According to aspects of the present disclosure, when a UE powers on or in response to an RLF procedure, the UE may use a synchronization signal associated with a serving TRP (or a last serving TRP) in an effort to perform a RACH procedure. Cell synchronization signals, such as a cell PSS and/or cell SSS, may be needed for DL-based mobility and initial network access. Accordingly, cells may already be transmitting the cell PSS/SSS. According to aspects of the present disclosure, the UE may advantageously use a cell synchronization signal which is already being transmitted, instead of a DL zone signal for performing a RACH procedure. As an example, the UE may perform a RACH procedure using a synchronization signal associated with a serving TRP, and not a DL zone signal, for initial access or in response to an RLF scenario. As described above, the DL zone signal may include one or more of a PSS/SSS of a zone and/or MRS-z. The UE and network may negotiate UL-based mobility through RRC signaling.

According to another example, a UE may be served by a TRP in a zone. The zone may also include one or more other non-serving TRPs. Operations related to inter-zone handovers (handovers between a TRP of a first zone and a TRP of a second zone) may be performed using a target TRP's synchronization signal, instead of a zone signal associated with the zone of the target TRP. For example, the network may command a UE to perform an inter-zone handover (e.g., based on measured UL chirp signals, etc.). The UE may use a synchronization signal associated with the target cell to access the target. According to one example, during an inter-zone handover, the UE may use a PSS/SSS associated with a target TRP to perform a RACH procedure to access the target TRP. Advantageously, the zone signal may not be needed by the UE during inter-zone handovers. The UE may save power by not scanning for and measuring a DL zone signal. In certain scenarios as described above, the network may save resources if it does not transmit the zone signal.

Thus as described above, in certain scenarios, the UE may use a synchronization signal associated with a serving TRP to perform a RACH procedure after waking up or to recover from a RLF. When performing a handover from a TRP of one zone to a TRP of another zone, the UE may use a synchronization signal associated with the target TRP. Therefore, in all of these scenarios, the UE may not need to use a DL zone signal to perform the RACH procedure.

Figure 11:
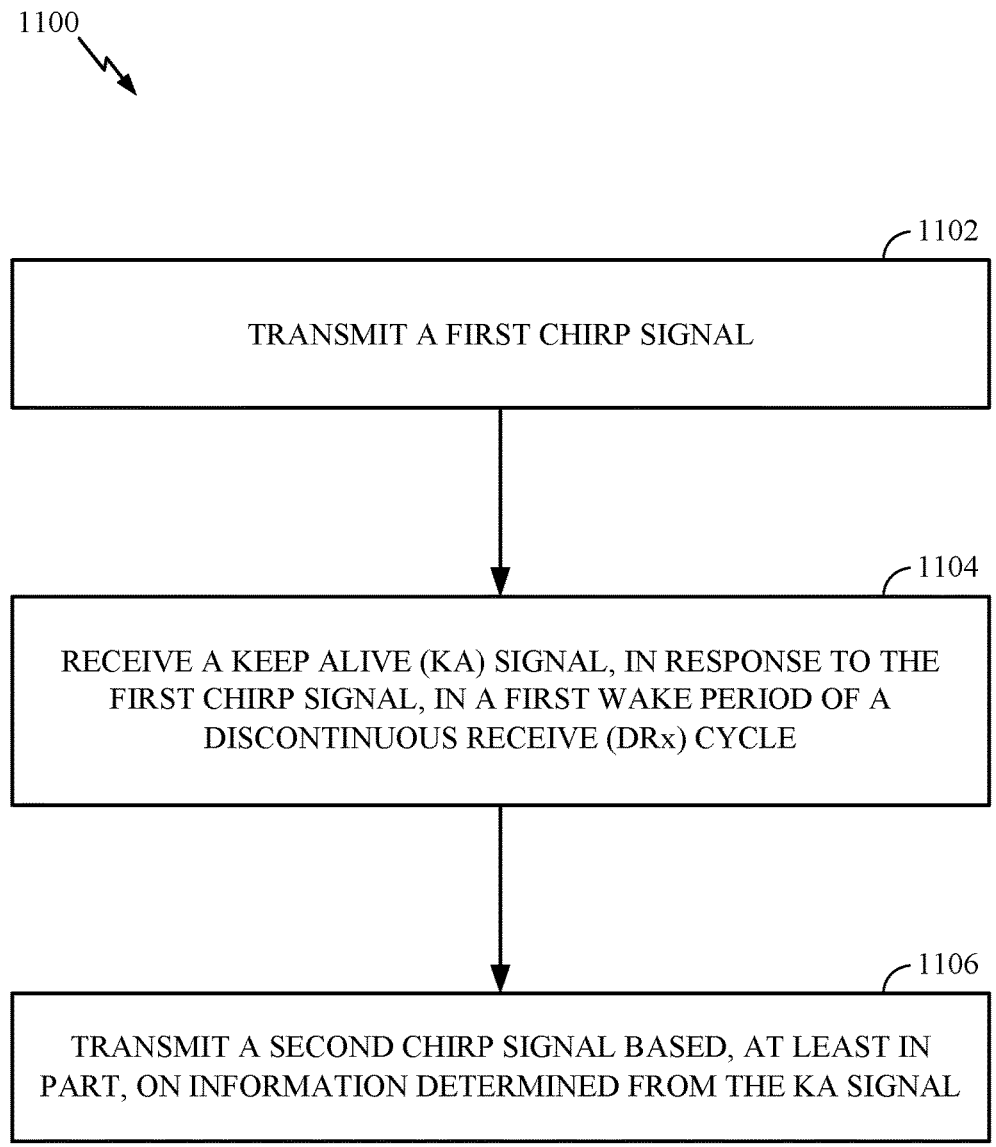
FIG. 11 illustrates example operations performed by a UE, in accordance with certain aspects of the present disclosure.

FIG. 11 illustrates example operations 1100 which may be performed by a UE, in accordance with aspects of the present disclosure. The UE may include one or more modules of UE 120 illustrated in FIG. 4. According to aspects, the UE may be the UE 1302 illustrated in FIG. 13 including one or more components configured to perform the operations described herein.

At 1102, the UE may transmit a first chirp signal. At 1104, the UE may receive a keep alive (KA) signal, in response to the first chirp signal, in a first wake period of a discontinuous receive (DRx) cycle. At 1106, the UE may transmit a second chirp signal based, at least in part, on information determined from the KA signal. As described below, the second chirp signal may be transmitted in a next DRx cycle.

In each DRx cycle, the UE may wake-up and transmit a chirp signal (see e.g., FIG. 9). The network may use a time tracking loop (TTL) and/or a frequency tracking loop (FTL) to detect the UL chirp signal. In response to the chirp signal, the network may transmit a KA. The UE may use the received KA for one or more of resynchronizing to the network or for estimating pathloss between the UE and the TRP transmitting the KA.

Thus, the UE may use information determined or derived from the KA in a previous DRx cycle to transmit a chirp signal in a different, next DRx cycle. Advantageously, instead of using a zone signal (e.g., zone synchronization signal, and/or MRS-z), for synchronizing to the network and determining the power level to transmit a chirp signal, the UE may use a KA. As a KA follows a first chirp signal, the UE may use measurements from a previous DRx cycle for UL transmission in a next DRx cycle.

In an effort to further improve the power control of future chirp transmissions, the KA transmitted on the Physical Keep Alive Channel (PKACH) may include a power control field. The power control field may include an indicator, such as, for example, a one-bit indicator. The power control field may indicate one of an increase or decrease in transmit power for the second chirp signal relative to the first chirp signal. For example, if the indicator is set (e.g., set to 1), relative to the transmit power used for the first chirp signal, the UE may increase the transmit power by x dB to transmit the second chirp signal. If the indicator is not set (e.g., set to 0), relative to the transmit power used for the first chirp signal, the UE may decrease the transmit power by x dB to transmit the second chirp signal. In this manner, the UE may use feedback received from the network via a KA to determine the power level for a chirp signal. Thus, the power control field of the KA may convert transmission of the chirp signal from an open-loop power control transmission to closed loop power control transmission.

According to aspects, the KA signal may be "light" in terms of footprint. In an effort to facilitate a UE using the KA for more than determining if it is being paged, a "dense" KA may be used. A dense KA may include more bits of information as compared to a light KA. The dense KA may include information related to at least one of synchronization to a serving TRP or open-loop power control for the second chirp signal. The dense KA may include additional bits to convey this information.

For a UE to use a PKACH for synchronization or open-loop power control, the PKACH may benefit from using an increased number of resource elements (as compared to if these functions were performed using a zone signal). The dense KA may be transmitted periodically, in an effort to minimize the increase in network energy and resources. The network may configure the UE to receive the dense KA with a periodicity. For example, the network may transmit a single dense KA after every N non-dense KAs. Thus, the dense KA may be received by the UE less frequently than non-dense KAs. The UE may transmit a second UL chirp signal using information determined from the dense KA.

Additionally or alternatively, the dense KA may include a flag in the KA itself, indicating the KA is dense and/or includes additional information as compared to a regular, non-dense KA. Thus, according to certain aspects, the dense KAs may not necessarily follow a pre-configured, periodic schedule. The flag may be used as an indication that the KA is a dense KA. As described above, the UE may transmit a second UL chirp signal using information determined from the dense KA.

Figure 12:
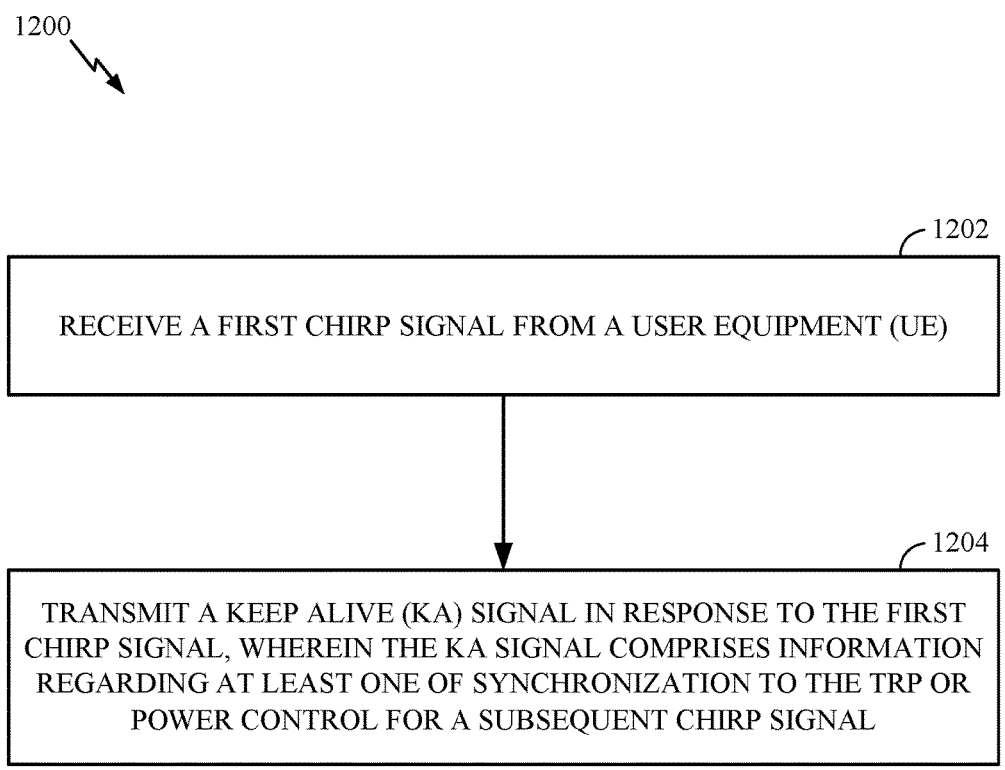
FIG. 12 illustrates example operations performed by a TRP, in accordance with certain aspects of the present disclosure.

FIG. 12 illustrates example operations 1200 which may be performed by a TRP, in accordance with aspects of the present disclosure. The TRP may include one or more modules of the TRP 110 illustrated in FIG. 4. According to aspects, the TRP may be the TRP 1402 illustrated in FIG. 14 including one or more components configured to perform the operations described herein.

At 1202, the TRP may receive a first chirp signal from a user equipment (UE). At 1204, the TRP may transmit a keep alive (KA) signal in response to the first chirp signal, wherein the KA signal comprises information regarding at least one of synchronization to the TRP or power control for a subsequent chirp signal (or a combination thereof).

The KA may include a power control field indicating presence of the information regarding power control. As described above, the information regarding power control may include an indication of one of increasing or decreasing transmit power for the subsequent chirp signal relative to the first chirp signal.

As described above, the KA may comprise a dense KA, wherein dense KAs are transmitted less frequently than non-dense KAs. Additionally or alternatively, the dense KA may include a flag indicating the KA comprises the increased number of bits and/or additional information. The TRP may transmit a configuration for future KA signals, wherein the configuration indicates a periodicity for transmitting the dense KA signal. The TRP may transmit the dense KA in accordance with the configuration. As described above, the dense KA signal comprises information related to open-loop power control for the subsequent chirp signal.

When the UE is paged, the UE may not know which TRP is transmitting the paging signal. In certain scenarios, after the UE is paged, an ANC may use a zone-based channel (e.g., a channel the UE may decode without knowing which TRP is transmitting the signal) to transmit information the UE may use to decode the PDCCH. For example, the ANC may transmit the information using a physical cell identity channel (PCICH). The UE may use the PCICH to decode the specific TRP's control message.

According to aspects, when a zone is not serving any UEs, TRPs in the zone may stop transmitting zone signals, in an effort to save resources.

Aspects of the present disclosure may reduce network energy by avoiding transmission of zone signals. For example, at least when no UEs are served by the zone, TRPs may not transmit zone synchronization signals or MRS-z. The network (TRPs) may advantageously transmit unicast KAs, which may be well-suited for massive MIMO and mmWave communication. Additionally, a UE may save power by not searching for, receiving, and measuring zone signals. Further open-loop power control for UL chirp signals may be improved using the KA as described herein. Finally, signaling between the UE and TRPs may be simplified by avoiding the use of zone signals. Thus, in accordance with aspects described herein, a zone signal may not be needed upon power-up or RLF recovery, for inter-zone handovers, or operations during each DRx cycle.

Figure 13:
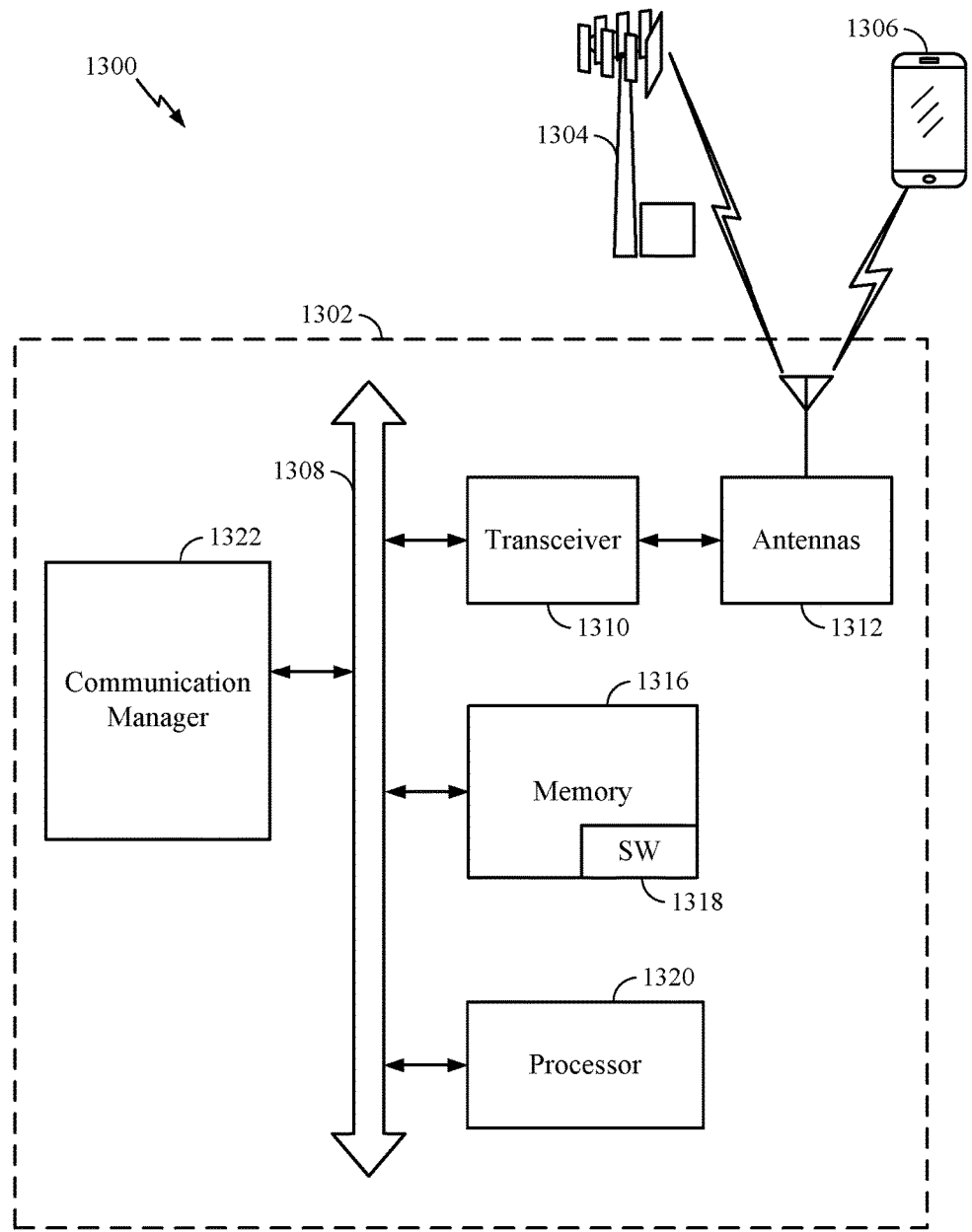
FIG. 13 illustrates a block diagram of a system including a UE configured for UL-centric mobility without the use of a DL-zone signal, according to aspects of the present disclosure.

FIG. 13 illustrates an example system 1300 of a UE configured to perform UL-based mobility and/or transmit an UL chirp signal based, at least in part, on a received KA, in accordance with aspects described herein. System 1300 may include UE 1302, which may be an example of a UE described above with reference to FIGS. 1 and 4 which may be configured to perform the operations described herein as illustrated in FIGS. 10 and 11. One or more of the modules illustrated in UE 1302 may be combined configured to perform the functionality described herein.

UE 1302 may include a communication manager module 1322, which may be configured to determine when to use a synchronization signal of a TRP (e.g. a serving or target TRP) to perform a RACH procedure. As described herein, the UE may use a synchronization signal of a TRP and not a DL zone synchronization signal when waking-up, performing an RLF procedure, or handing over from a TRP in a first zone to a TRP in a second zone.

The UE 1302 may include the communication manager module 1322 to process a received KA and transmit an UL chirp signal based, at least in part on the received KA, as described herein. The KA may include information related to, for example, transmit power for the chirp signal, a periodicity of a dense KA, and/or synchronization information.

The UE 1302 may also include components for bi-directional voice and data communications including components for transmitting communications and components for receiving communications. For example, UE 1302 may communicate bi-directionally with UE 1306 or TRP 1304.

UE 1302 may also include a processor module 1320, and memory 1316 (including software (SW) 1318), a transceiver module 1310, and one or more antenna(s) 1312, each of which may communicate, directly or indirectly, with one another (e.g., via buses 1308). The transceiver module 1310 may communicate bi-directionally, via the antenna(s) 1312 or wired or wireless links, with one or more networks, as described above. For example, the transceiver module 1310 may communicate bi-directionally with a TRP 1304 or another UE 1306. The transceiver module 1310 may include a modem to modulate the packets and provide the modulated packets to the antenna(s) 1312 for transmission, and to demodulate packets received from the antenna(s) 1312. While the UE 1302 may include a single antenna 1312, the UE 1302 may also have multiple antennas 1312 capable of concurrently transmitting or receiving multiple wireless transmissions.

The memory 1316 may include random access memory (RAM) and read only memory (ROM). The memory 1316 may store computer-readable, computer-executable software/firmware code including instructions that, when executed, cause the processor module 1320 to perform various functions described herein (e.g., performing a RACH procedure without DL zone signals and/or transmit a chirp signal using information transmitted in the received DL KA). Alternatively, the software/firmware code may not be directly executable by the processor module 1320 but cause a computer (e.g., when compiled and executed) to perform functions described herein. The processor module 1320 may include an intelligent hardware device (e.g., a central processing unit (CPU), a microcontroller, an ASIC, etc.).

Figure 14:
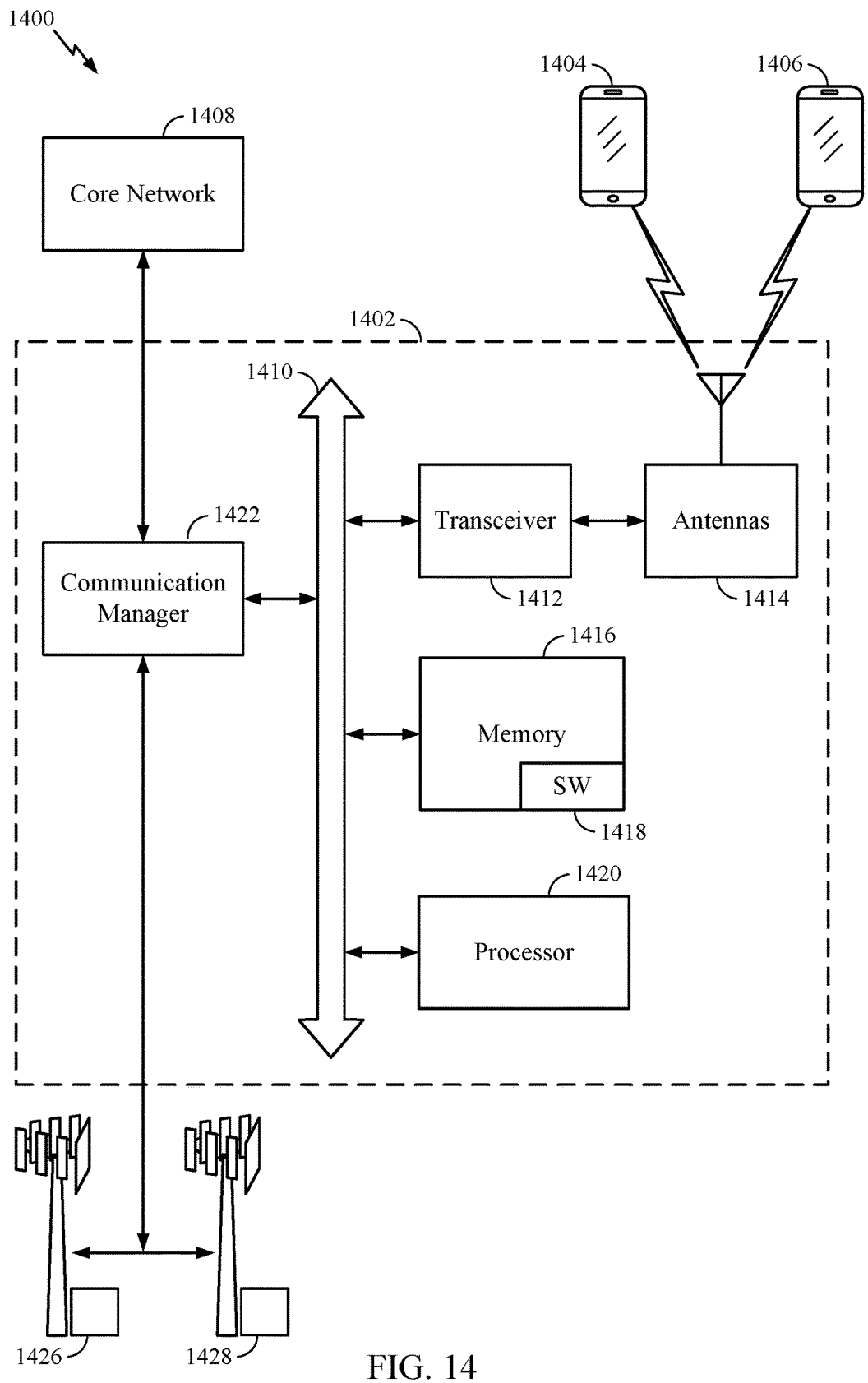
FIG. 14 illustrates a block diagram of a system including a TRP configured to transmit a KA message, according to aspects of the present disclosure.

FIG. 14 illustrates an example of a system 1400 including a TRP configured to support UL mobility and transmit a KA including one or more of synchronization information or transmit power control information, in accordance with various aspects of the present disclosure. System 1400 may include TRP 1402, which may be an example of a base station/TRP described above with reference to FIGS. 1 and 4 which may be configured to perform the operations described herein as illustrated in FIG. 12. One or more of the modules illustrated in UE 1402 may be combined into a single module configured to perform the functionality described herein.

TRP 1402 may include a communication manager module 1422 configured to transmit a KA message including one or more of synchronization information associated with the TRP or transmit power control for a chirp signal to be transmitted by a UE, in accordance with aspects of the present disclosure. TRP 1402 may also include components for bi-directional voice and data communications including components for transmitting communications and components for receiving communications. For example, TRP 1802 may communicate bi-directionally with UE 1404 or UE 1406.

In some cases, TRP 1402 may have one or more wired backhaul links. TRP 1402 may have a wired backhaul link (e.g., S1 interface, etc.) to the core network 1408. TRP 1402 may also communicate with other TRPs, such as TRP 1426 and TRP 1428 via inter-TRP (inter-BS) backhaul links (e.g., an X2 interface). Each of the TRPs may communicate with UEs 1404 and 1406 using the same or different wireless communications technologies. In some cases, TRP 1402 may communicate with other TRPs such as 1426 or 1428 utilizing TRP the communications manager 1422. In some embodiments, TRP communications manager 1422 may provide an X2 interface within an LTE/LTE-A wireless communication network technology to provide communication between some of the TRPs. In some embodiments, TRP 1402 may communicate with other TRPs through core network 1408. In some cases, TRP 1402 may communicate with the core network 1408 through communications manager 1422.

The TRP 1402 may include a processor module 1420, memory 1416 (including software (SW) 1418), transceiver modules 1412, and antenna(s) 1414, which each may be in communication, directly or indirectly, with one another (e.g., over bus system 1410). The transceiver modules 1412 may be configured to communicate bi-directionally, via the antenna(s) 1414, with the UEs 1404, 1406, which may be multi-mode devices. The transceiver module 1412 (or other components of the TRP) may also be configured to communicate bi-directionally, via the antennas 1414, with one or more other TRPs (not shown). The transceiver module 1412 may include a modem configured to modulate the packets and provide the modulated packets to the antennas for transmission, and to demodulate packets received from the antennas 1414. The TRP may include multiple transceiver modules 1412, each with one or more associated antennas 1414. The transceiver module may be an example of a combined receiver and transmitter.

The memory 1416 may include RAM and ROM. The memory 1416 may also store computer-readable, computer-executable software code 1418 containing instructions that are configured to, when executed, cause the processor module 1420 to perform various functions described herein (e.g., handling interference in a heterogeneous numerology environment). Alternatively, the software code 1418 may not be directly executable by the processor module 1420 but be configured to cause the computer (e.g., when compiled and executed), to perform functions described herein. The processor module 1420 may include an intelligent hardware device, (e.g., a CPU, a microcontroller, an ASIC, etc.). The processor module 1420 may include various special purpose processors such as encoders, queue processing modules, base band processors, radio head controllers, digital signal processor (DSPs), and the like. The communications manager 1422 may manage communications with other base TRPs 1426, 1428.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for perform the operations described herein and illustrated in FIGS. 10-12.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method of wireless communication by a user equipment (UE), comprising:
   transmitting a first chirp signal;
   receiving a first keep alive (KA) signal, in response to the first chirp signal, in a first wake period of a discontinuous receive (DRx) cycle;
   transmitting a second chirp signal based, at least in part, on information determined from the first KA signal;
   receiving a page in response to the second chirp signal; and
   in response to the received page, synchronizing to a serving transmit/receive point (TRP) using a physical cell identity channel (PCICH).

2. The method of claim 1, further comprising:
   determining at least one of a transmit power or timing information for transmitting the second chirp signal based, at least in part, on the first KA signal, and
   wherein the second chirp signal is transmitted using at least one of the determined transmit power or the determined timing information.

3. The method of claim 1, further comprising:
   decoding a power control field in the first KA signal, and
   wherein the second chirp signal is transmitted at a power level based, at least in part, on the decoded power control field.

4. The method of claim 3, wherein the power control field indicates one of an increase or decrease in transmit power for the second chirp signal relative to the first chirp signal.

5. A method of wireless communication by a user equipment (UE), comprising:
   receiving a configuration for keep alive (KA) signals including at least one dense KA signal, the at least one dense KA signal received less frequently than non-dense KA signals;
   transmitting a first chirp signal;
   receiving a first KA signal, in response to the first chirp signal, in a first wake period of a discontinuous receive (DRx) cycle; and
   transmitting a second chirp signal based, at least in part, on information determined from the first KA signal.

6. The method of claim 5, wherein the configuration comprises a periodicity for the at least one dense KA signal.

7. The method of claim 5, further comprising:
receiving the at least one dense KA signal in accordance with the configuration, wherein the at least one dense KA signal comprises information related to at least one of synchronization to a serving transmit/receive point (TRP) or open-loop power control for the second chirp signal, and
wherein the second chirp signal is transmitted based, at least in part, on the information related to at least one of synchronization to a serving transmit/receive point (TRP) or open-loop power control for the second chirp signal in the at least one dense KA signal.

8. The method of claim 1,
wherein the first KA signal includes a flag indicating the first KA signal comprises information related to at least one of synchronization to a serving transmit/receive point (TRP) or open-loop power control for the second chirp signal, and
wherein the second chirp signal is transmitted based, at least in part on the information related to at least one of synchronization to a serving transmit/receive point (TRP) or open-loop power control for the second chirp signal in the first KA signal.

9. An apparatus for wireless communications by a user equipment (UE), comprising:
a transceiver configured to:
transmit a first chirp signal;
receive a first keep alive (KA) signal, in response to the first chirp signal, in a first wake period of a discontinuous receive (DRx) cycle;
transmit a second chirp signal based, at least in part, on information determined from the first KA signal; and
receive a page in response to the second chirp signal; and
at least one processor configured to, in response to the received page, synchronize to a serving transmit/receive point (TRP) using a physical cell identity channel (PCICH).

10. The apparatus of claim 9, wherein the at least one processor is further configured to determine at least one of a transmit power or timing information for transmitting the second chirp signal based, at least in part, on the first KA signal.

11. The apparatus of claim 10, wherein the transceiver is further configured to transmit the second chirp signal using at least one of the determined transmit power or the determined timing information.

12. The apparatus of claim 9, wherein the at least one processor is further configured to decode a power control field in the first KA signal.

13. The apparatus of claim 12, wherein the transceiver is further configured to transmit the second chirp signal at a power level based, at least in part, on the decoded power control field.

14. The apparatus of claim 12, wherein the power control field indicates one of an increase or decrease in transmit power for the second chirp signal relative to the first chirp signal.

15. The apparatus of claim 9, wherein the first KA signal includes a flag indicating that the first KA signal comprises information related to at least one of synchronization to a serving transmit/receive point (TRP) or open-loop power control for the second chirp signal, and
wherein the transceiver is further configured to transmit the second chirp signal based, at least in part, on the information related to at least one of synchronization to a serving transmit/receive point (TRP) or open-loop power control for the second chirp signal in the first KA signal.

16. An apparatus for wireless communications by a user equipment (UE), comprising:
a transceiver configured to:
receive a configuration for keep alive (KA) signals including at least one dense KA, the at least one dense KA received less frequently than non-dense KA signals;
transmit a first chirp signal;
receive a first KA signal, in response to the first chirp signal, in a first wake period of a discontinuous receive (DRx) cycle; and
transmit a second chirp signal based, at least in part, on information determined from the first KA signal; and
at least one processor.

17. The apparatus of claim 16, wherein the configuration indicates a periodicity for the at least one dense KA signal.

18. The apparatus of claim 16, wherein the transceiver is further configured to receive the at least one dense KA signal in accordance with the configuration.

19. The apparatus of claim 16, wherein the at least one dense KA signal comprises information related to at least one of synchronization to a serving transmit/receive point (TRP) or open-loop power control for the second chirp signal.

20. The apparatus of claim 19, wherein the transceiver is further configured to transmit the second chirp signal based, at least in part, on the information related to at least one of synchronization to a serving transmit/receive point (TRP) or open-loop power control for the second chirp signal in the at least one dense KA signal.

* * * * *